Jan. 4, 1949.　　　S. LANGLEY ET AL　　　2,458,276
ELECTRIC CONDUIT CONNECTOR
Filed July 29, 1947
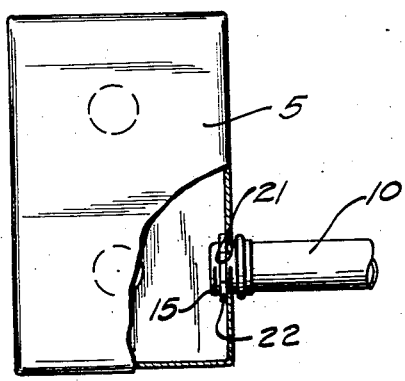
FIG.1.
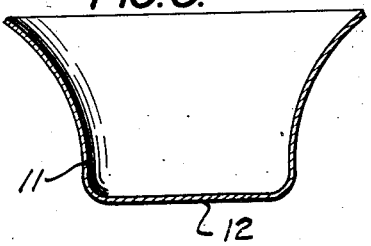
FIG.5.
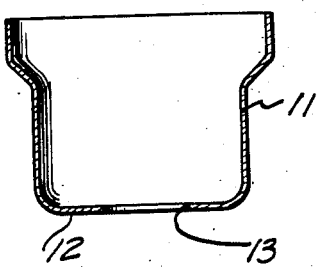
FIG.6.
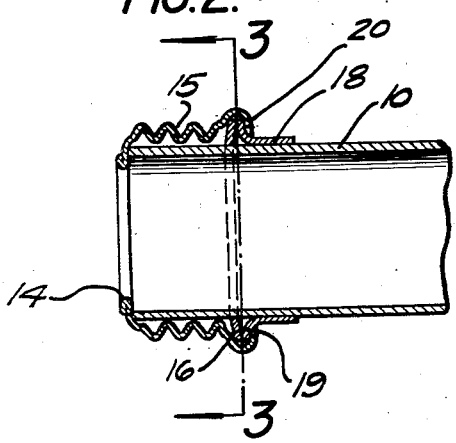
FIG.2.
FIG.3.
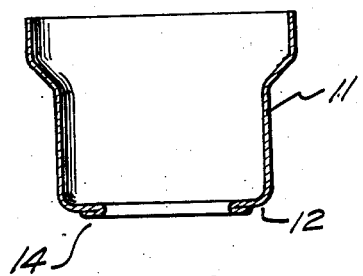
FIG.7.
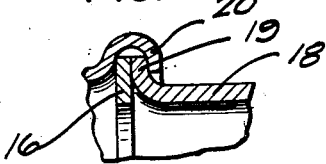
FIG.4.
INVENTOR.
STANLEY LANGLEY.
ALFRED WARRING.
BY
ATTORNEY.

Patented Jan. 4, 1949

2,458,276

UNITED STATES PATENT OFFICE 2,458,276

ELECTRIC CONDUIT CONNECTOR

Stanley Langley, West Toronto, Ontario, Canada, and Alfred Warring, Detroit, Mich., assignors, by direct and mesne assignments, of one-third to said Warring, one-third to Norman A. Grams, and one-third to William Noponen, all of Detroit, Mich.

Application July 29, 1947, Serial No. 764,406
In Canada July 2, 1947

4 Claims. (Cl. 285—6.5)

Our invention relates to a useful improvement in electrical conduit connectors for connecting electrical conduits or metallic tubing to outlet boxes or other similar fittings.

It is an object of the present invention to provide a connector of this class which will be simple in structure, economical of manufacture, durable, light, compact, easily and quickly installed, highly efficient in use, and rigid when mounted in position.

Another object of the invention is the provision of a connector of this class having a gripping member so arranged so that when a conduit is inserted into the connector the gripping member will automatically engage the periphery of the conduit and prevent its withdrawal, while at the same time the connector will be provided with an abutment for limiting the inward thrust of the conduit.

Another object of the invention is the provision of a connector of this class having an automatic gripping member and provided with a guide sleeve for guiding the conduit into position and aligning it prior to its passage through the gripping member.

Another object of the invention is the provision of a connector so arranged and constructed that the lateral thrust delivered to the conduit after it has been mounted in the connector will be resisted to a maximum degree and thus distortion of the connector through lateral thrust or strains on the connector or conduit will be prevented.

Another object of the invention is the provision of a connector of this class having a rolled thread thereon so arranged and constructed that the inner faces of the inner thread will determine the diameter of the conduit to be received therein and thus serve as an additional alining element alining the conduit with a gripping ring.

Other objects will appear hereinafter.

It is recognized that various modifications and changes may be made in the detailed structure illustrated without departing from the invention and it is intended that such shall be embraced within the scope of the claims that form a part hereof.

Forming a part of this specification are drawings in which,

Fig. 1 is a side elevational view of an outlet box with a part broken away showing the invention applied.

Fig. 2 is longitudinal central sectional view of the invention showing it applied.

Fig. 3 is a sectional view taken on line 3—3 of Fig. 2,

Fig. 4 is a slightly enlarged fragmentary sectional view illustrating the fastening of the separate parts together.

Fig. 5 is a central sectional view of the nipple in one stage of its formation.

Fig. 6 is a central sectional view of the nipple in another state of its formation.

Fig. 7 is a cross sectional view of the nipple at another stage of its formation.

As shown in the drawings the invention comprises a threaded nipple 15 on which the threads are rolled so that the threads appear externally and internally. It will be noted that the terminal portion at one end of the nipple is not threaded and this terminal portion is doubled over as at 20 to provide a clamping flange which is adapted to clamp in position a gripping ring 16 and a flange 19 on a guide sleeve 18.

The opposite end of the nipple or sleeve is doubled upon itself as at 14, to provide a reinforced end and an end having a curved surface free from sharp edges or projections. The gripping ring 16 is formed of suitable resilient metal and is inwardly slotted at spaced part points as at 17. The sleeve 18 is of the same inside diameter as the outside diameter of the conduit or the pipe 10 which it is desired to connect and the inner faces of the threads of the rolled threaded portion lie in contact with the periphery of the conduit or pipe 10. The opening through the ring 16 is slightly less than the outside diameter of the pipe 10 so that normally, before the pipe 10 is inserted in position, the ring 16 will extend at right angles to the axis of the nipple 15 and its inner edge will project inwardly slightly from the inner surface of the guide pipe or sleeve 18 as clearly shown in Fig. 4.

In Fig. 1, I have shown the conduit 10 attached to an outlet box 5. In mounting the structure in position the nipple will be threaded through the outlet opening in the wall 21, this inward threading being extended as far as possible or until the wall 21 encounters the outwardly bulged portion at the end of the nipple. A lock-nut 22 is then threaded onto the threaded portion within the outlet box. The conduit 10 is then forced inwardly of the guide sleeve 8 which snugly receives this conduit 10 and permits its easy passage therethrough. This guide sleeve 18 serves to aline the conduit 10 before its inner end meets the gripping ring 16. When brought into contact with the gripping ring 16 an inward thrust on the conduit will cause the gripping ring to flex slightly as shown in Fig. 2. The inward movement of the conduit or pipe 10 will continue until the shoulder at the doubled-over portion 14 is contacted by the end of the conduit. When in this position pipe 10 cannot be withdrawn, as the gripping ring will securely grip the periphery of the conduit or pipe 10 and prevent its withdrawal. By doubling over the portion 14 a smooth surface is provided so that there can be no marring or defacing or tearing of the insulation on cables or electric wires which may be passed through the conduit 10 into the outlet box 9. It will be noted that the conduit 10 extends considerably inwardly from the inner face of the wall 21. Conduit 10 is also engaged at its periphery from the end of the sleeve 18 to substantially the shoulder at the doubled-over fold 14. This affords a very rigid mounting as lateral thrusts or side strains on the conduit 10 are thus resisted by a large body of the connector and by having the conduit extended inwardly from the inner face of the wall 21 the lateral thrust or strain is resisted to a maximum degree by the wall 21 itself so that the wall 21 co-operating with the connector effects the rigid construction which is desired in mountings of this type.

In Figs. 5, 6, and 7 I have shown one form of manufacture of the nipple. In this form I have provided a body which is formed cup shaped having the side walls 11 and the base 12. In Fig. 6, the base 12 is shown with a central opening 13 formed therethrough and in Fig. 7, this central opening is enlarged by doubling over the bottom 12 as at 14 to provide the abutment shoulder. When a tubular member is used and it is desired to form it from a light metal, as is the nipple 15, and it is desired to roll the thread thereon, it is necessary that some means be provided for preventing collapsing of the tubular member during the thread rolling operation. This doubled over portion 14 serves as the necessary re-inforcement for preventing this collapsing or crushing of the tubular member while the thread rolling operation is taking place.

It is believed obvious that the structure may be economically manufactured and that it may be easily and quickly assembled, being possessed of the few parts that it is possessed of and parts which are easily assembled. In assembling, the ring 16 is placed in position and the flange 19 also placed in position to engage in the space provided at one end of the nipple. This end of the nipple is then upset to clamp these parts securely in position as clearly shown in Fig. 2.

Experience has shown that the structure is one which is most efficiently used for various reasons set out herein.

What we claim as new is:

1. A conduit connector of the class described comprising: an externally threaded tubular nipple; an inwardly turned portion at one end of said nipple to provide an annular body of smaller diameter than the internal diameter of the nipple; an outwardly bulged portion on the opposite end of said nipple; a gripping ring positioned in said outwardly bulged portion; a guide sleeve; an outwardly projecting flange on one end of said guide sleeve, said outwardly projecting flange engaging in said outwardly bulged portion; and a clamping structure on said outwardly bulged portion for clamping said flange and said ring in fixed relation to said nipple.

2. A connector of the class described, comprising: a tubular nipple externally threaded; an outwardly bulged portion on one end of said nipple; a gripping ring position in said outwardly bulged portion, said nipple having an internal diameter of a size of a pipe to be inserted therein, and said ring having an opening therethrough of less diameter than the outside diameter of said pipe; a guide tube; a flange on said guide tube engaging in said outwardly bulged portion and said tube projecting outwardly from said nipple concentric thereto and having an internal diameter equal to the outside diameter of pipe to be projected thereinto; and a portion on said outwardly bulged portion for clamping said flange and said ring in fixed relation to said nipple.

3. A connection of the class described, comprising: a tubular nipple externally threaded; an outwardly bulged portion on one end of said nipple; a gripping ring positioned in said outwardly bulged portion, said nipple having an internal diameter of a size of a pipe to be inserted therein, and said ring having an opening therethrough of less diameter than the outside diameter of said pipe; a guide tube; a flange on said guide tube engaging in said outwardly bulged portion and said tube projecting outwardly from said nipple concentric thereto and having an internal diameter equal to the outside diameter of pipe to be projected thereinto; an overturned portion on said outwardly bulged portion for clamping said flange and said ring in fixed relation to said nipple; and an abutment means on the opposite end of said nipple for engaging the end face of a pipe inserted into said nipple.

4. A connector of the class described, comprising: a tubular nipple externally threaded; an outwardly bulged portion on one end of said nipple; a gripping ring positioned in said outwardly bulged portion, said nipple having an internal diameter of a size of a pipe to be inserted therein, and said ring having an opening therethrough of less diameter than the outside diameter of said pipe; a guide tube; a flange on said guide tube engaging in said outwardly bulged portion and said tube projecting outwardly from said nipple concentric thereto and having an internal diameter equal to the outside diameter of pipe to be projected thereinto; an overturned portion on said outwardly bulged portion for clamping said flange and said ring in fixed relation to said nipple; and an abutment means on the opposite end of said nipple for engaging the end face of a pipe inserted into said nipple, the abutment member being doubled upon itself to provide an edge curvilinear in cross section.

STANLEY LANGLEY.
ALFRED WARRING.

REFERENCES CITED

The following references are of record in the file of this patent:

UNITED STATES PATENTS

| Number | Name | Date |
|---|---|---|
| 1,383,718 | Grunwald | July 5, 1921 |
| 1,725,883 | Recker | Aug. 27, 1929 |
| 1,809,582 | Church | June 9, 1931 |
| 2,270,926 | Briegel, et al. | Jan. 27, 1942 |
| 2,341,164 | Shimek | Feb. 8, 1944 |